(12) United States Patent
Mitsuhashi (10) Patent No.: US 9,656,578 B2
(45) Date of Patent: May 23, 2017

(54) VEHICLE SEAT

(71) Applicant: TOYOTA BOSHOKU KABUSHIKI KAISHA, Aichi-ken (JP)

(72) Inventor: Atsutaka Mitsuhashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 59 days.

(21) Appl. No.: 14/718,657

(22) Filed: May 21, 2015

(65) Prior Publication Data

US 2015/0336483 A1   Nov. 26, 2015

(30) Foreign Application Priority Data

May 23, 2014   (JP) ................. 2014-106667

(51) Int. Cl.
  *A47C 1/00*   (2006.01)
  *A61G 15/00*   (2006.01)
  (Continued)

(52) U.S. Cl.
  CPC ............... *B60N 2/309* (2013.01); *B60N 2/12* (2013.01); *B60N 2/305* (2013.01); *B60N 2/3009* (2013.01);
  (Continued)

(58) Field of Classification Search
  CPC .... B60N 2/3093; B60N 2/309; B60N 2/3011; B60N 2/3061; B60N 2/12; B60N 2/20;
  (Continued)

(56) References Cited

U.S. PATENT DOCUMENTS 3,416,839 A * 12/1968 Flint .................. A47C 1/03255
                                                    297/301.1
4,636,002 A    1/1987 Genjiro
(Continued)

FOREIGN PATENT DOCUMENTS

CN          103847538       6/2014
DE     10 2006 047 383      4/2008
(Continued)

OTHER PUBLICATIONS

U.S. Appl. No. 14/718,778 to Koji Kimura et al., filed May 21, 2015.
(Continued)

*Primary Examiner* — Chi Q Nguyen
(74) *Attorney, Agent, or Firm* — Greenblum & Bernstein, P.L.C.

(57) ABSTRACT

A vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, and wherein the power transmission member is configured by a link member of a rigid body and is configured to, when the seat back is raised from a forward tilted down position, transmit the movement of the seat back to the front link to raise the front link to thus pull up the seat cushion from a downward sunk position.

7 Claims, 8 Drawing Sheets

(51) Int. Cl.
*B60N 2/00* (2006.01)
*B60N 2/02* (2006.01)
*B60N 2/30* (2006.01)
*B60N 2/44* (2006.01)
*B60N 2/12* (2006.01)
*B60N 2/20* (2006.01)
*B60N 2/36* (2006.01)

(52) U.S. Cl.
CPC ......... *B60N 2/3013* (2013.01); *B60N 2/3061* (2013.01); *B60N 2/3065* (2013.01); *B60N 2/3075* (2013.01); *B60N 2/36* (2013.01); *B60N 2/442* (2013.01); *B60N 2/20* (2013.01); *B60N 2/3011* (2013.01); *B60N 2/3093* (2013.01); *B60N 2002/363* (2013.01)

(58) Field of Classification Search
CPC B60N 2/3013; B60N 2002/363; B60N 2/305; B60N 2/36
USPC .... 297/340, 341, 327, 344.1, 344.15, 452.2, 297/260.1, 378.1, 378.12, 378.11; 296/65.01
See application file for complete search history.

(56) References Cited

U.S. PATENT DOCUMENTS

| | | | | |
|---|---|---|---|---|
| 5,527,087 | A * | 6/1996 | Takeda | B60N 2/2352 297/15 |
| 6,000,742 | A * | 12/1999 | Schaefer | B60N 2/3011 296/65.09 |
| 6,079,763 | A * | 6/2000 | Clemente | B60N 2/3011 248/430 |
| 8,235,466 | B2 * | 8/2012 | Yamada | B60N 2/3011 297/284.1 |
| 8,388,065 | B2 | 3/2013 | Harden | |
| 8,585,147 | B2 | 11/2013 | Calvert | |
| 2009/0108616 | A1 * | 4/2009 | Kolena | B60N 2/01583 296/65.05 |
| 2009/0127904 | A1 * | 5/2009 | Yamada | B60N 2/3011 297/284.1 |
| 2009/0146477 | A1 * | 6/2009 | Yamada | B60N 2/3011 297/354.1 |
| 2009/0152888 | A1 * | 6/2009 | Zelmanov | B60N 2/206 296/65.09 |
| 2009/0167068 | A1 | 7/2009 | Yamagishi | |
| 2010/0084903 | A1 | 4/2010 | Kämmerer | |
| 2011/0042994 | A1 | 2/2011 | Saito et al. | |

FOREIGN PATENT DOCUMENTS

| | | |
|---|---|---|
| DE | 10 2008 050 468 | 4/2010 |
| DE | 10 2012 209 688 | 1/2013 |
| EP | 1 902 896 | 3/2008 |
| JP | 2009-154682 | 7/2009 |
| JP | 5382709 | 10/2013 |

OTHER PUBLICATIONS

U.S. Appl. No. 14/718,530 to Koji Kimura et al., filed May 21, 2015.

Official Action, along with English-language translation thereof, in CN Appl. No. 201510271662.7 dated Dec. 28, 2017.

Official Action, along with English-language translation thereof, in DE Appl. No. 10 2015 209 438.3 dated Mar. 3, 2017.

* cited by examiner

VEHICLE SEAT

CROSS-REFERENCE TO RELATED APPLICATIONS

This application claims priority from Japanese Patent Application No. 2014-106667 filed on May 23, 2014, the entire contents of which are incorporated herein by reference.

TECHNICAL FIELD

Aspects of the present invention relate to a vehicle seat. More particularly, aspects of the present invention relate to a vehicle seat including a tilt down mechanism that sinks down a seat cushion in conjunction with forward tilting down movement of a seat back.

BACKGROUND

In related art, a seat for an automobile has been known which has a so-called tilt down mechanism configured to sink down a seat cushion in conjunction with forward tilting down movement of a seat back, thereby lowering the entire seat (see JP-A-2009-154682). The tilt down mechanism is configured to suspend a rear part of the seat cushion to the seat back by a link and to obliquely push down the entire seat cushion in a front-lower direction as the seat back is tilted down forward.

According to the above technology, the entire seat cushion is sunk down. Therefore, the corresponding technology is unfavorable to a configuration where a hybrid battery is embedded in a region under the floor, for example, so that it is not possible to form a deep sinking space. It is therefore an object of the present invention to provide a tilt down mechanism capable of effectively sinking down a seat cushion also in a narrow sinking space.

SUMMARY

In order to achieve the above object, aspects of the present invention provide the following vehicle seat.

According to an aspect of the present invention, there is provided a vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, wherein the tilt down mechanism is configured so that the power transmission member tilts the front link downward in conjunction with the forward tilting down movement of the seat back, thereby sinking down the front part of the seat cushion about the rotary shaft, and wherein the power transmission member is configured by a link member of a rigid body and is configured to, when the seat back is raised from a forward tilted down position, transmit the movement of the seat back to the front link to raise the front link to thus pull up the seat cushion from a downward sunk position.

Accordingly, the seat cushion is configured to sink down to the floor so that the front part thereof is dropped about the rotary shaft at the rear side by the tilt down mechanism. In general, the seat cushion is configured in many cases so that a pad thickness is set to be thick in a rear region of the seat cushion so as to support hip parts having a high sitting pressure and is set to be relatively thinner in a front region of the seat cushion to support the femoral regions, as compared to the pad thickness in the rear region of the seat cushion, and the seat cushion is formed to have a front rising shape so as to prevent the hip parts from sliding forward. Therefore, when the seat cushion is configured to sink down to the floor so that the front part thereof is dropped about the rear side rotary shaft, as described above, it is possible to effectively sink down the seat cushion also in a narrow sinking space. Also, the power transmission member is configured by the link member of a rigid body, and the seat cushion can be pulled up by the movement of raising the seat back, so that it is possible to configure the tilt down mechanism with a small number of components. The corresponding configuration is not limited to a case where it is applied to the narrow sinking space of the seat cushion, and can also be applied to a wide sinking space. That is, the corresponding configuration can be applied to a variety of configurations, as one of methods of sinking down the seat cushion.

DETAILED DESCRIPTION

Hereinafter, an illustrative embodiment of the present invention will be described with reference to the drawings.

[First Illustrative Embodiment]

Figure 1:
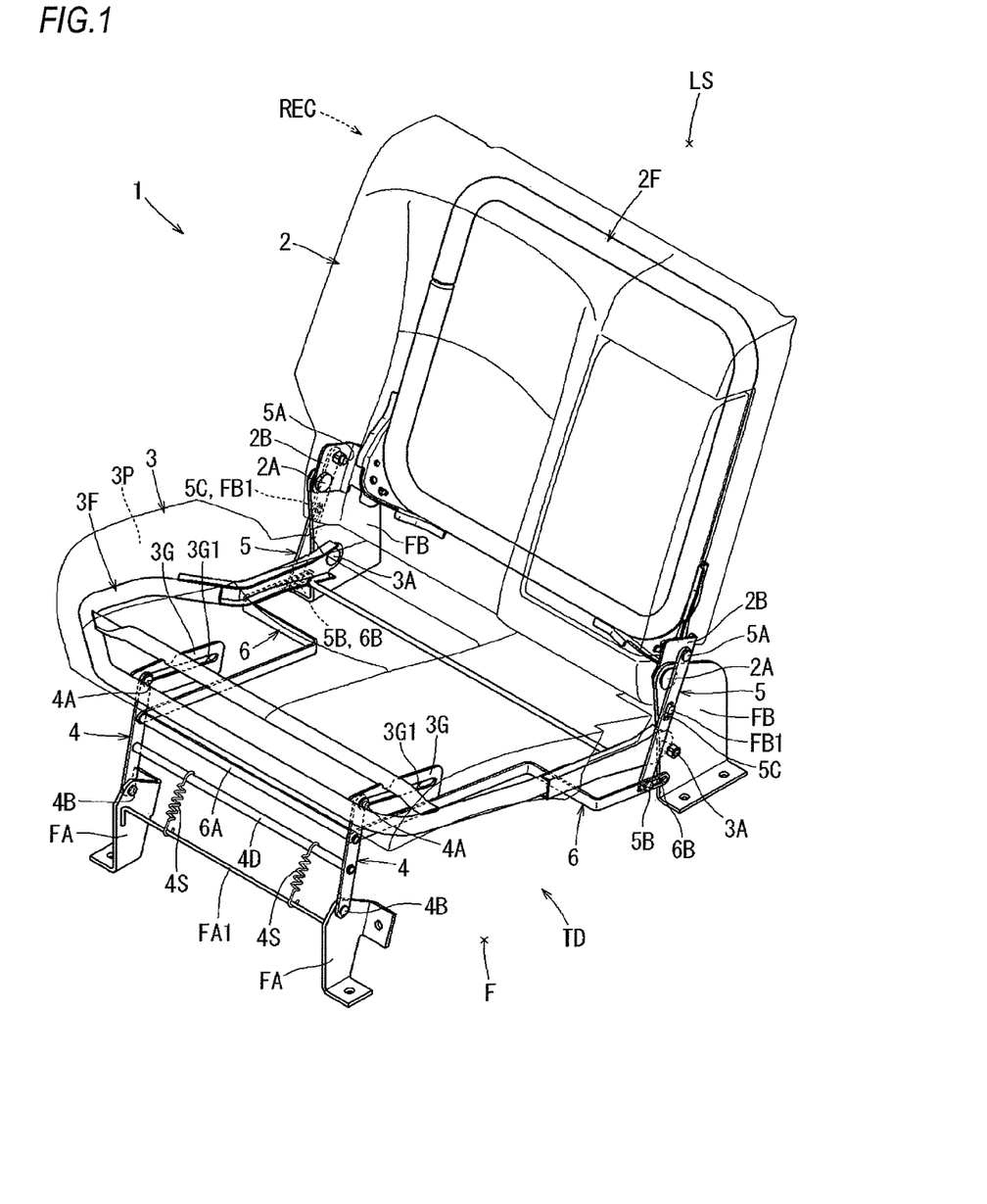
FIG. 1 is a perspective view illustrating a configuration of a vehicle seat of a first illustrative embodiment.

First, a configuration of a seat 1 of a first illustrative embodiment is described with reference to FIGS. 1 to 8. As shown in FIG. 1, the seat 1 of the illustrative embodiment is configured as a rear seat for an automobile, and a luggage space LS of a vehicle is formed at the rear of the seat 1. The seat 1 has a seat back 2 serving as a backrest of a sitting passenger and a seat cushion 3 serving as a sitting part. The seat 1 has a reclining mechanism REC configured to adjust a backrest angle of the seat back 2, and a tilt down mechanism TD (see FIGS. 4 to 6) configured to sink down the seat cushion 3 in conjunction with forward tilting down movement of a seat back.

Figure 4:
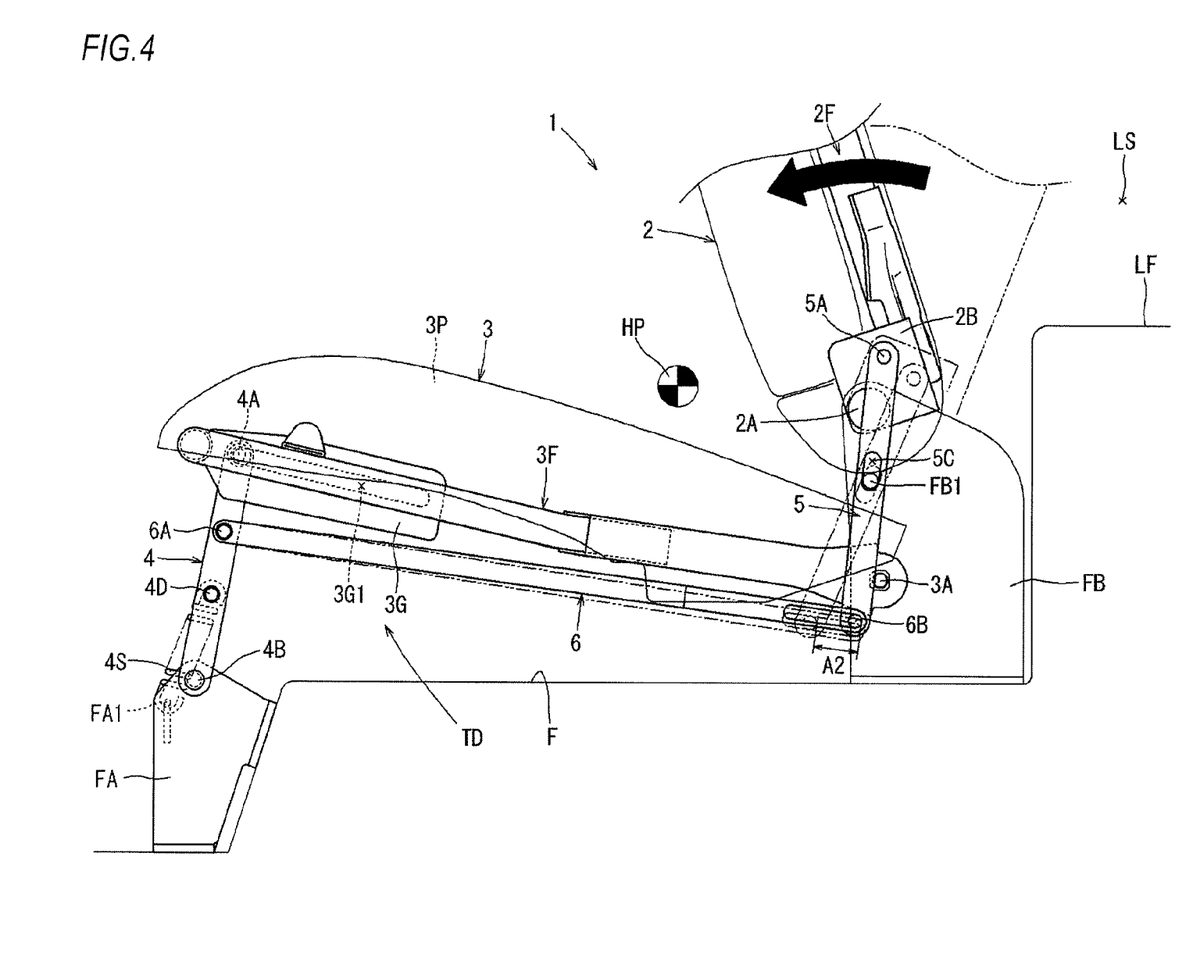
FIG. 4 is a side view illustrating a state where the seat back is tilted down to a forward tilting position.
Figure 5:
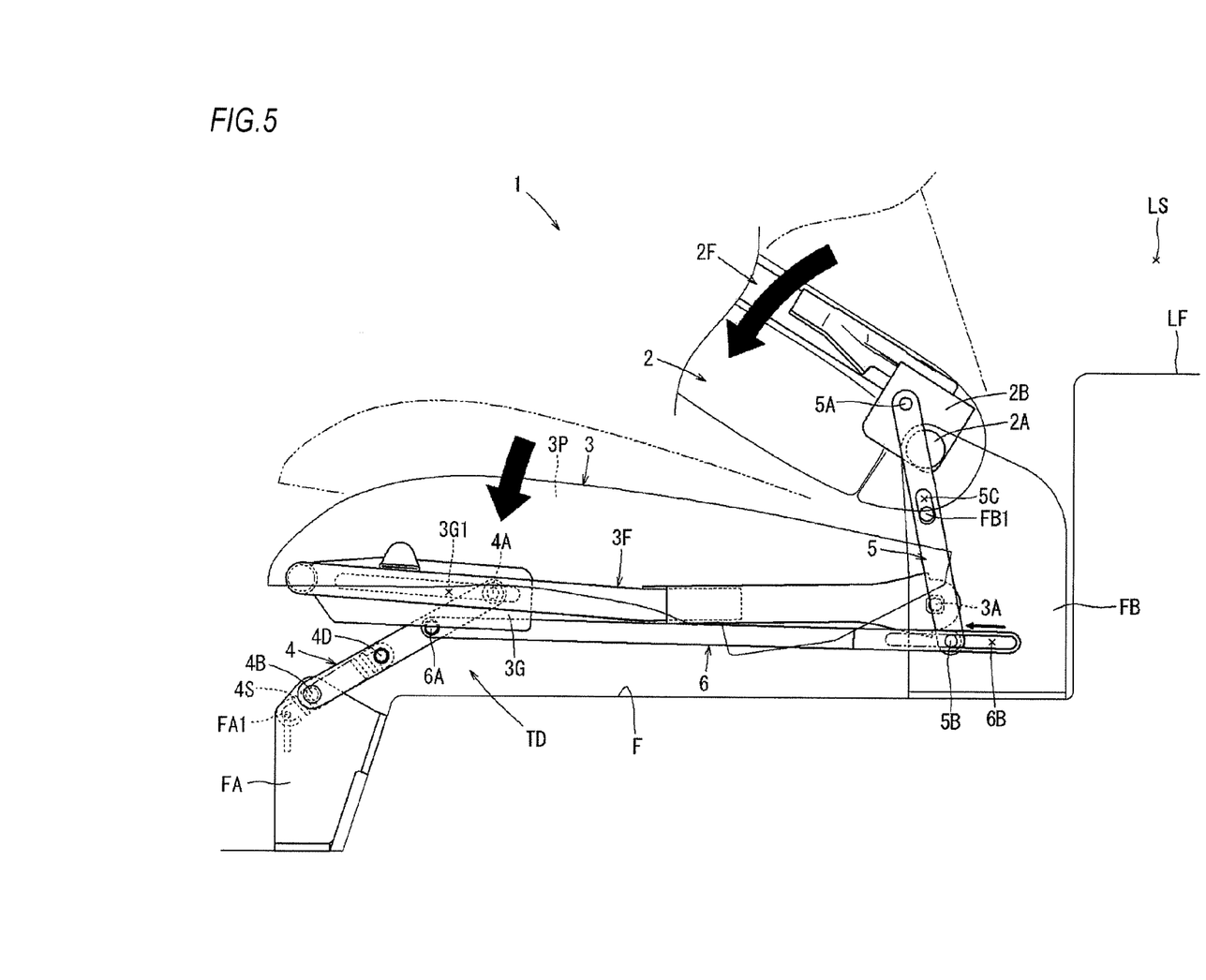
FIG. 5 is a side view illustrating a state where the seat back is being further tilted down forward from the forward tilting position.
Figure 6:
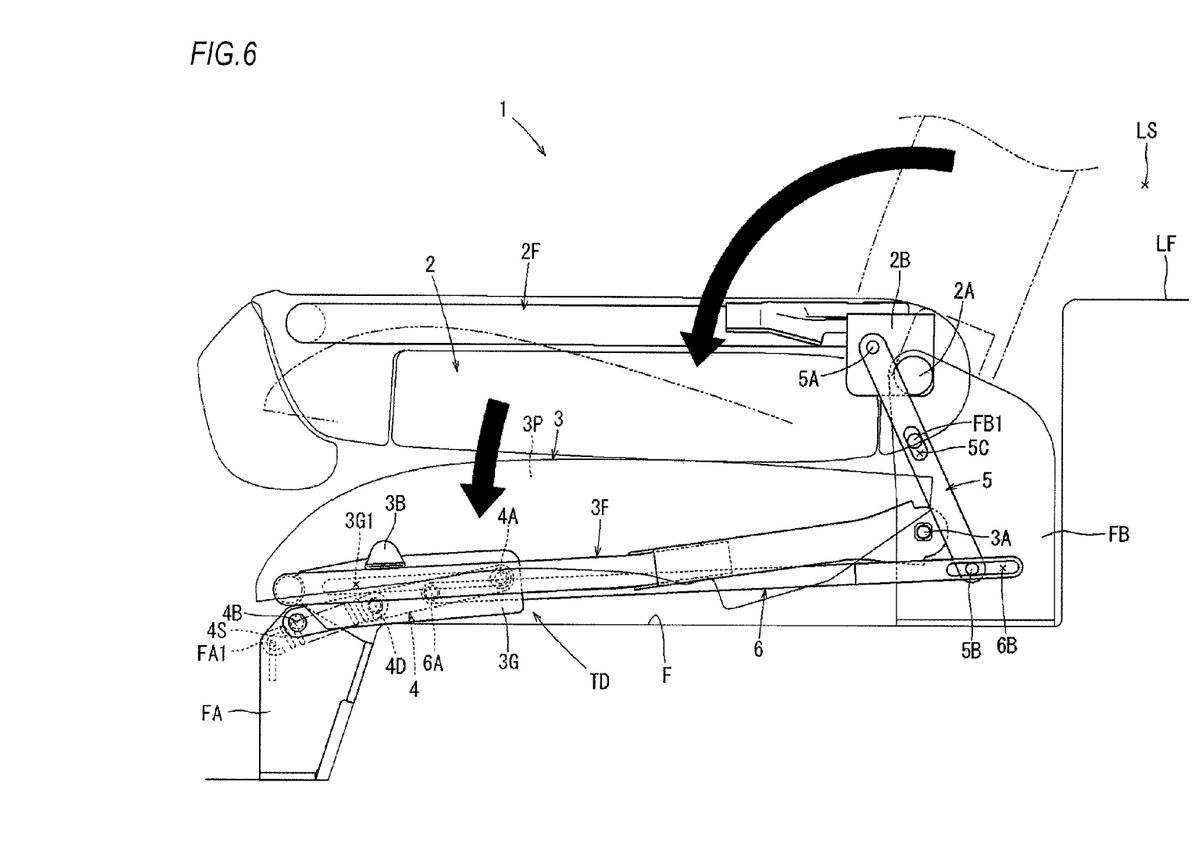
FIG. 6 is a side view illustrating a state where the seat back is tilted down forward and a seat cushion is thus sunk down.

The reclining mechanism REC is configured to fix the backrest angle of the seat back 2 with respect to a vehicle side part and to change the backrest angle of the seat back 2 by changing the fixed position of the seat back 2 with respect to the vehicle side part. As shown in FIGS. 4 to 6, the tilt down mechanism TD is configured to drop the seat cushion 3 onto a floor F in conjunction with the forward tilting down movement of the seat back 2, thereby tilting down the seat back 2 to a low position flush with a luggage floor LF, as shown in FIG. 6.

In the illustrative embodiment, although the seat 1 is configured to drop the seat cushion 3 in conjunction with the forward tilting down movement of the seat back 2 by the tilt down mechanism TD, the seat 1 also prevents the seat cushion 3 from moving when the seat back 2 is tilted within an adjustment region of the backrest angle. By the configuration, even when the backrest angle of the seat back 2 is changed, it is possible to keep the seat cushion 3 at a fixed position all the time, thereby maintaining a favorable ride quality. In the below, the specific configurations of the respective parts of the seat 1 are described in detail.

As shown in FIG. 1, the seat back 2 is coupled at lower end portions of both left and right sides thereof to a pair of left and right rear bases FB fixed on the floor F by coupling shafts 2A so that it can be rotated rearward and forward. Specifically, the seat back 2 has a configuration where respective brackets 2B coupled to lower end portions of both left and right sides of a back frame 2F forming a frame of the seat back 2 are rotatably coupled to each of a pair of left and right rear bases FB fixed on the floor F by the respective coupling shafts 2A of which an axis direction faces towards a width direction of the seat.

Although not shown, the seat back 2 has a configuration where a lock device provided at a shoulder part of a vehicle outer side, which is a left side of FIG. 1, is locked to a striker provided at the vehicle side part, so that the backrest angle is fixed. The striker, which is not shown, is attached to the vehicle side part to be slidable rearward and forward and can be locked at each slid position. Thereby, the backrest angle of the seat back 2 fixed by the striker can be adjusted by changing a slide position of the striker (the reclining mechanism REC).

Figure 2:
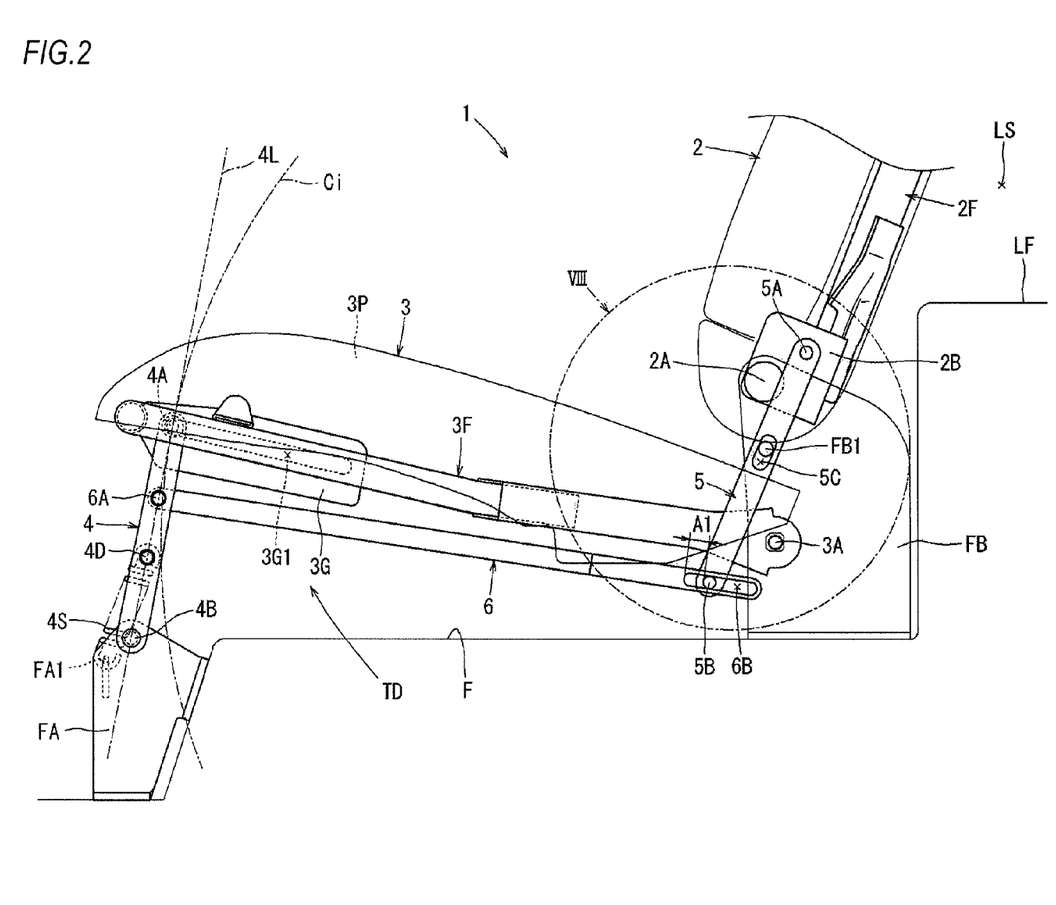
FIG. 2 is a side view of a seat back.
Figure 3:
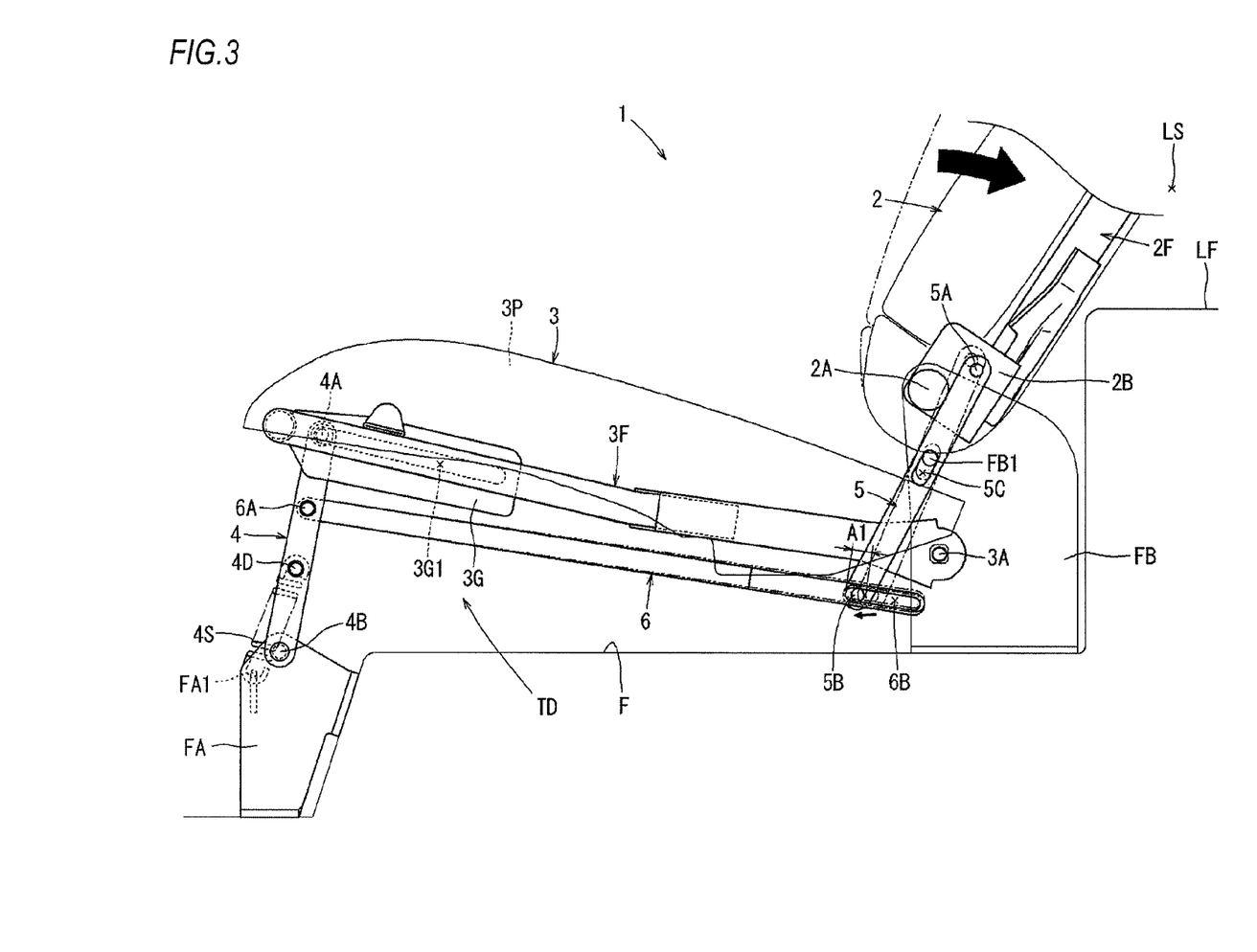
FIG. 3 is a side view illustrating a state where a backrest angle of the seat back is tilted rearward.

As shown in FIGS. 2 and 3, a moveable range of the striker (not shown) is set within an angle range in which the seat back 2 is tilted rearward from an upright posture. Thereby, it is possible to fix the backrest angle of the seat back 2 within the moveable range of the striker so that the backrest angle can be adjusted relative to the vehicle side part. In the meantime, since the specific configuration of the reclining mechanism REC (see FIG. 1) is the same as the well-known configuration disclosed in Japanese Patent No. 5,382,709, for example, the specific description thereof is omitted. When the locked state of the seat back 2 to the striker is released, the seat back 2 can be tilted forward beyond the adjustable range of the backrest angle, as shown in FIGS. 4 to 6.

As shown in FIG. 1, the seat cushion 3 is coupled at rear end portions of both left and right sides thereof to the pair of left and right rear bases FB fixed on the floor F to be rotatable in a height direction by respective rotary shafts 3A of which an axis direction faces towards the width direction of the seat. Specifically, the seat cushion 3 has a configuration where rear end portions of both left and right sides of a cushion frame 3F, which is formed by bending a round pipe forming a frame of the seat cushion 3 into a U shape, are rotatably coupled to each of the pair of left and right rear bases FB fixed on the floor F by the respective rotary shafts 3A of which an axis direction faces towards the width direction of the seat.

The seat cushion 3 has a configuration where front parts of both left and right sides thereof are respectively coupled to each of a pair of left and right front bases FA fixed on the floor F via front links 4 at a raised position. Here, each front base FA and each rear base FB correspond to the 'base' of the present invention. Specifically, the seat cushion 3 has a configuration where upper end portions of the respective front links 4 are respectively coupled to a pair of left and right guide plates 3G, which are coupled to a front frame part of the cushion frame 3F and extend rearward, to be rotatable and to be slidable rearward and forward via slide shafts 4A. Each slide shaft 4A is coupled in a long hole 3G1, which is formed at the guide plate 3G and extends rearward and forward, to be rotatable and to be slidable rearward and forward with an axis direction thereof facing towards the width direction of the seat.

A lower end portion of each front link 4 is rotatably coupled to each front base FA by each coupling shaft 4B of which an axis direction faces towards the width direction of the seat. Thereby, each front link 4 can be rotated to rise or fall rearward and forward about the lower end-side coupling shaft 4B within the range in which the upper end-side slide shaft 4A can slide rearward and forward in the long hole 3G1 of the guide plate 3G.

As shown in FIG. 2, when each front link 4 is rotated to rise forward about the lower end-side coupling shaft 4B, the upper end-side slide shaft 4A is slid to a front end portion position in the long hole 3G1 of the guide plate 3G, so that the front link 4 takes a posture standing up to a substantially vertical angle position from each front base FA. Thereby, a front side part of the seat cushion 3 is supported at an angle posture of a front rising shape.

At this state (state where each slide shaft 4A is slid to the front end portion position in the long hole 3G1 of each guide plate 3G), each front link 4 takes a posture where a line 4L connecting the upper end-side slide shaft 4A and the lower end-side coupling shaft 4B forms a tangential line of a circle Ci drawn around the rear end-side rotary shaft 3A of the seat cushion 3. Thereby, each front link 4 supports the seat cushion 3 from below at a stable posture where the front link is not tilted even when the load is applied thereto from the seat cushion 3.

Also, first links 5 and second links 6 are coupled between the respective front links 4 and the seat back 2 so that each front link 4 is tilted rearward as the seat back 2 is tilted forward. The first links 5 and the second links 6 are respectively provided in a pair at left and right sides to couple the respective front links 4 and the left and right side frame parts of the back frame 2F forming a frame of the seat back 2.

Specifically, as shown in FIG. 1, each first link 5 is configured by a link member that is long in the height direction, and is rotatably coupled at its upper end portion to each bracket 2B, which is coupled to each of the lower end portions of the left and right sides of the back frame 2F forming a frame of the seat back 2, by each coupling shaft 5A of which an axis direction faces towards the width direction of the seat. As shown in FIGS. 2 and 3, each coupling shaft 5A is arranged so that it is positioned in an upper-rear region of each rotary shaft 2A serving as a center of rotation of the seat back 2 at a state where the seat back 2 is located within the adjustment region of the backrest angle.

Also, each first link 5 is configured to extend downward from a coupling point (the coupling shaft 5A) with the seat back 2, and a lower end portion thereof is coupled to be rotatable and to be slidable rearward and forward in each long hole 6B, which is formed at a rear end portion of the second link 6 and extends rearward and forward, via each slide shaft 5B of which an axis direction faces towards the width direction of the seat. Further, each first link 5 is rotatably shaft-supported at its central part in the height direction to each rear base FB by each support shaft FB1 of which an axis direction faces towards the width direction of the seat.

Specifically, each support shaft FB1 attached to an outer side of the rear base FB is coupled to be rotatable and to be vertically slidable in a long hole 5C of the first link 5, which is formed at a central part of the first link 5 in the height direction and extends in a link length direction (height direction). Thereby, as shown in FIGS. 2 to 7, each first link 5 is configured to absorb the movement, which makes the upper end-side coupling shaft 5A move rearward and forward around the rotary shaft 2A serving as a center of rotation of the seat back 2 in conjunction with the tilting movement of the seat back 2, by the vertical movement of the long hole 5C relative to the support shaft FB1 of each rear base FB, thereby swinging rearward and forward about the support shaft FB1.

As shown in FIG. 1, each second link 6 is configured by a link member that is long in the front-rear direction, and is rotatably coupled at its front end portion to a central part of each front link 4 by one coupling shaft 6A that is long in the width direction of the seat. Each second link 6 is configured to extend rearward from a coupling point (the coupling shaft 6A) with the front link 4, and each slide shaft 5B attached to the lower end portion of the first link 5 is coupled to be rotatable and to be slidable rearward and forward in each long hole 6B, which is formed to be penetrated at a rear end portion of the second link 6 and is long in the longitudinal direction (front-rear direction) of the link.

Figure 7:
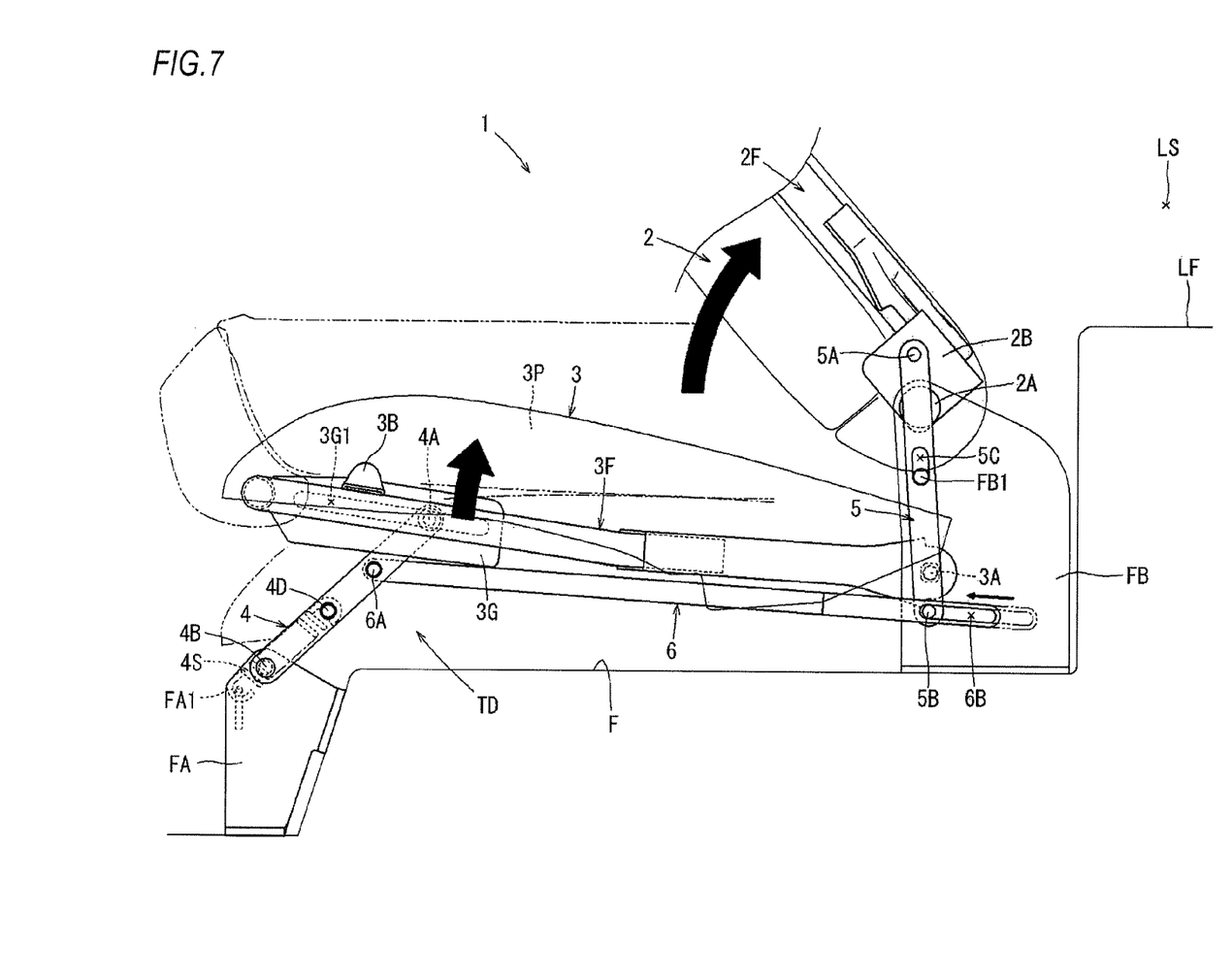
FIG. 7 is a side view illustrating a state where the seat back is being raised from the position at which the seat back is tilted forward.
Figure 8:
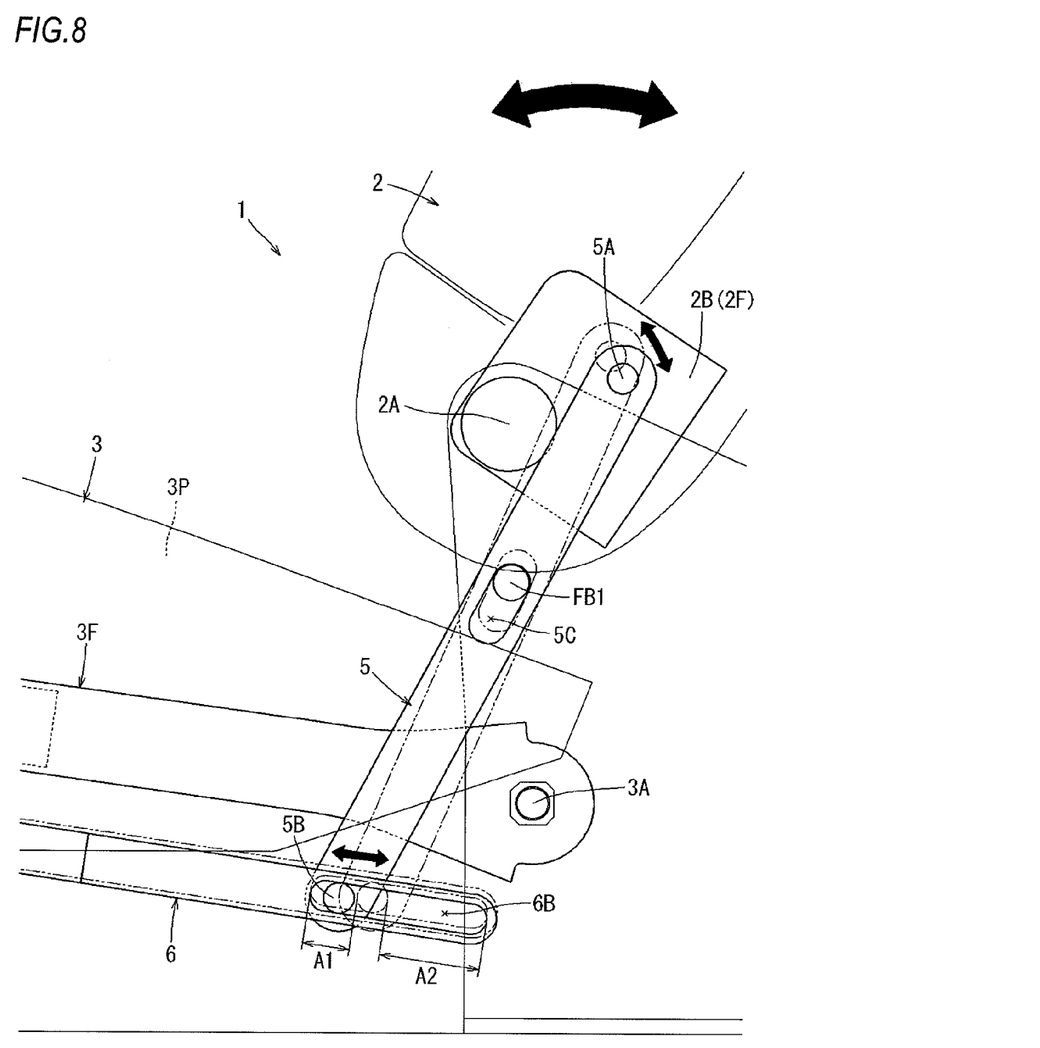
FIG. 8 is an enlarged view of a VIII part of FIG. 2.

By the above coupling, as shown in FIGS. 5 and 6, when each first link 5 is rotated in a shown counterclockwise direction about the coupling point with each rear base FB (support shaft FB1) in conjunction with the forward tilting of the seat back 2, each second link 6 is retracted rearward by the lower end-side slide shaft 5B of the first link 5, thereby tilting each front link 4 rearward. Also, as shown in FIG. 7, when each first link 5 is rotated in a shown clockwise direction about the coupling point with each rear base FB (support shaft FB1) as the seat back 2 is raised rearward from the forward tilted position, each second link 6 is pushed forward by the lower end-side slide shaft 5B of the first link 5, thereby raising each front link 4 forward.

Here, as shown in FIG. 2, at an upright posture state where the seat back 2 is used as the backrest and the lower end-side slide shaft 5B of each first link 5 is positioned at a central part of the long hole 6B of each second link 6 in the front-rear direction, even when the backrest angle of the seat back 2 is changed within the adjustment region of the backrest angle, each first link 5 and each second link 6 do not transmit power accompanied by a change movement amount thereof to each front link 4. Specifically, as described above, at the upright posture state where the seat back 2 is used as the backrest, each long hole 6B is formed to have a forward extension margin A1 forming a clearance within which the lower end-side slide shaft 5B of each first link 5 can be slid forward (see FIG. 8).

By this configuration, as shown in FIGS. 2 and 3, even when the seat back 2 is angle-changed rearward and forward within the adjustment region of the backrest angle, the lower end-side slide shaft 5B of each first link 5 is slid within the forward extension margin A1 of the long hole 6B of each second link 6 and each second link 6 cannot be moved rearward and forward. Therefore, even when the seat back 2 is angle-changed rearward and forward in the adjustment region of the backrest angle, the seat cushion 3 is kept at a fixed position all the time.

Also, even when the seat back 2 is tilted down forward to a forward tilting position shown in FIG. 4 from the upright posture position at which the seat back 2 is used as the backrest, each first link 5 and each second link 6 do not transmit the power (rearward retraction force) accompanied by the change movement amount to each front link 4. Specifically, as described above, at the upright posture state where the seat back 2 is used as the backrest, each long hole 6B formed at the second link 6 is formed to have a rearward extension margin A2 forming a clearance within which the lower end-side slide shaft 5B of each first link 5 can be slid rearward (see FIG. 8).

By this configuration, as shown in FIG. 4, even when the seat back 2 is tilted downward to the forward tilting position, the lower end-side slide shaft 5B of each first link 5 is just slid within the rearward extension margin A2 of the long hole 6B of each second link 6 and each second link 6 is not retracted rearward. Thereby, when adjusting the backrest angle of the seat back 2, it is possible to prevent an unexpected situation where each front link 4 is erroneously tilted downward. The forward tilting position of the seat back 2 shown in FIG. 4 is a position at which the seat back 2 is tilted forward to a position set as a hip point HP of a sitting passenger.

As shown in FIGS. 5 and 6, each first link 5 and each second link 6 are configured so that when the seat back 2 is further tilted down forward from the forward tilting position shown in FIG. 4, the lower end-side slide shaft 5B of each first link 5 collides with the rear end portion of the rearward extension margin A2 of the long hole 6B of each second link 6 to push the second link 6, thereby retracting each second link 6 rearward. Thereby, each front link 4 coupled to the front end portion of each second link 6 is tilted down rearward. As a result, the seat cushion 3 is pushed down to drop the front part thereof onto the floor F about the rear end-side rotary shaft 3A, so that the seat back 2 is tilted down into an open space and the entire seat 1 is deeply sunk down.

Also, each first link 5 and each second link 6 are configured so that when the seat back 2 is raised rearward from the forward tilted down position shown in FIG. 6, the lower end-side slide shaft 5B of each first link 5 collides with the front end portion of the forward extension margin A1 of the long hole 6B of each second link 6 to push each second link 6 forward, as shown in FIG. 7. Thereby, each front link 4 coupled to the front end portion of each second link 6 is raised forward. As a result, the seat cushion 3 is pulled up to raise the front part thereof from the floor F about the rear end-side rotary shaft 3A, so that the seat cushion is returned to an initial sitting using position shown in FIG. 2.

Here, as shown in FIG. 1, two tensile springs 4S are hooked between the respective front links 4 and the respective front bases FA. The tensile springs 4S are respectively hooked at left and right sides between a bridging shaft 4D bridged between the respective front links 4 and a hanging wire FA1 bridged between the respective front bases FA. As shown in FIGS. 2 and 3, when each front link 4 is located in an upright rotating angle region, the tensile spring 4S passes over a region upper to the lower end-side coupling shaft 4B of each front link 4, thereby applying a rotational urging force to each front link 4 in a forward raising direction.

However, as shown in FIGS. 5 and 6, when each front link 4 is tilted rearward as the seat back 2 is tilted forward, each tensile spring 4S traverses a region lower to the lower end-side coupling shaft 4B of each front link 4. Thereby, the direction of the rotating urging force applied to each front link 4 is switched, so that each tensile spring 4S applies the rotating urging force to each front link 4 in a rearward tilting direction.

The turnover-type tensile springs 4S are hooked between the respective front links 4 and the respective front bases FA, so that when the respective front links 4 are located at the upright rotating posture, as shown in FIGS. 2 and 3, the upper end-side slide shafts 4A thereof are kept in a state of being pressed to the front end portion positions of the long holes 3G1 of the respective guide plates 3G. Thereby, as described above, each front link 4 is configured to stably keep the upright posture state where the front link 4 is not tilted even when the load is applied thereto from the seat cushion 3.

Also, as shown in FIGS. 5 and 6, when the respective front links 4 are retracted and tilted rearward by the first links 5 and the second links 6 as the seat back 2 is tilted forward, the respective front links 4 are pressed and kept in a state of being tilted rearward by the urging force of the respective tensile springs 4S. Thereby, each front link 4 is stably kept in a state of being pressed to the floor F without rattling on the floor F.

Also, as shown in FIG. 7, when the seat cushion 3 is pulled up as the seat back 2 is raised, each front link 4 is raised while the upper end-side slide shaft 4A is slid forward along the guide shape of the long hole 3G1 formed at each guide plate 3G of the seat cushion 3. When the seat back 2 is returned to the backrest using position (the adjustment region of the backrest angle) as shown in FIG. 2, the upper end-side slide shaft 4A is applied with the urging force of each tensile spring 4S and is thus returned to the state pressed to the front end portion position of each long hole 3G1 of the seat cushion 3, so that each front link 4 stably supports the seat cushion 3 from below at the initial sitting using position.

In summary, the seat 1 of the illustrative embodiment is configured as follows. That is, the seat 1 includes the tilt down mechanism TD configured to sink down the seat cushion 3 in conjunction with the forward tilting down movement of the seat back 2. The tilt down mechanism TD couples the rear part of the seat cushion 3 to the base (rear base FB) on the floor F by the rotary shaft 3A, couples the front part of the seat cushion 3 to the base (front base FA) on the floor F via the front link 4, and further includes the power transmission member (the first link 5 and the second link 6) that couples the front link 4 and the seat back 2. The tilt down mechanism TD is configured so that the power transmission member (the first link 5 and the second link 6) tilts the front link 4 downward in conjunction with the forward tilting down movement of the seat back 2, thereby sinking down the front part of the seat cushion 3 about the rotary shaft 3A. The power transmission member (the first link 5 and the second link 6) is configured by the link member of a rigid body and is configured to, when the seat back is raised from a forward tilted down position, transmit the movement of the seat back 2 to the front link 4 to raise the front link 4 to thus pull up the seat cushion 3 from the downward sunk position.

By the above configuration, the seat cushion 3 is configured to sink down to the floor F so that the front part thereof is dropped about the rotary shaft 3A at the rear side by the tilt down mechanism TD. In general, as shown in FIG. 2, the seat cushion 3 is configured in many cases so that a pad thickness of a cushion pad 3P in the height direction is set to be thick in the rear region of the seat cushion 3 so as to support hip parts having a high sitting pressure and is set to be relatively thinner in the front region of the seat cushion 3 to support the femoral regions, as compared to the pad thickness in the rear region of the seat cushion 3, and the seat cushion 3 is formed to have the front rising shape so as to prevent the hip parts from sliding forward. Therefore, when the seat cushion 3 is configured to sink down to the floor F so that the front part thereof is dropped about the rear side rotary shaft 3A, as described above, it is possible to effectively sink down the seat cushion 3 also in the narrow sinking space. Also, the power transmission member (the first link 5 and the second link 6) is configured by the link member of a rigid body, and the seat cushion 3 can be pulled up by the movement of raising the seat back 2, so that it is possible to configure the tilt down mechanism TD with a small number of components.

Also, when the seat back 2 is within the tilting down region in front of a predetermined forward tilting angle (the forward tilting position shown in FIG. 4) at which the seat back 2 is in front of the adjustment region of the backrest angle, the power transmission member (the first link 5 and the second link 6) is configured to transmit the forward tilting down movement of the seat back 2 to the front link 4 as a tilting down force, and when the seat back 2 is within a region rear to the tilting down region, the power transmission member is configured to release the power transmission from the seat back 2 to the front link 4. According to this configuration, when adjusting the backrest angle of the seat back 2, it is possible to prevent an unexpected situation where the front link 4 is erroneously tilted downward.

Also, the power transmission member is configured so that the first link 5 rotatably coupled to the seat back 2 and extending downward and the second link 6 rotatably coupled to the front link 4 and extending rearward are rotatably coupled to each other to transmit the movement of the seat back 2 to the front link 4. In this way, by configuring the power transmission member by the first link 5 and the second link 6, even when the seat back 2 is tilted down forward or raised from the tilted down position, the power transmission member can move without largely protruding from the seat shape. Therefore, it is possible to implement a compact configuration.

Although the illustrative embodiment of the present invention has been described with reference to one example, the present invention can be implemented in a variety of aspects, in addition to the above illustrative embodiment. For example, the 'vehicle seat' of the present invention can be applied to a seat of an automobile other than the rear seat, and can also be applied to a variety of vehicle seats such as a 'seat for a train', a 'seat for an airplane' and a 'seat for a ship'.

Also, the power transmission member is not limited to the configuration having the first link and the second link, and may be configured to couple the front link and the seat back by one link member. Also, the front link may be configured to tilt downward as the lower end-side coupling part thereof slides rearward and forward. Also, the front link may be configured to tilt forward, not to tilt rearward. Also, the base on the floor configured to couple the front part or rear part of the seat back may be configured by a member fixed on the floor such as a slide rail.

Also, the configuration of the present invention is not limited to a case where it is applied to the narrow sinking space of the seat cushion, and can also be applied to a wide sinking space. That is, the present invention can be applied to a variety of configurations, as one of methods of sinking down the seat cushion.

The present invention provides illustrative, non-limiting aspects as follows:

According to an aspect of the present invention, there is provided a vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, wherein the tilt down mechanism is configured so that the power transmission member tilts the front link downward in conjunction with the forward tilting down movement of the seat back, thereby sinking down the front part of the seat cushion about the rotary shaft, and wherein the power transmission member is configured by a link member of a rigid body and is configured to, when the seat back is raised from a forward tilted down position, transmit the movement of the seat back to the front link to raise the front link to thus pull up the seat cushion from a downward sunk position.

Accordingly, the seat cushion is configured to sink down to the floor so that the front part thereof is dropped about the rotary shaft at the rear side by the tilt down mechanism. In general, the seat cushion is configured in many cases so that a pad thickness is set to be thick in a rear region of the seat cushion so as to support hip parts having a high sitting pressure and is set to be relatively thinner in a front region of the seat cushion to support the femoral regions, as compared to the pad thickness in the rear region of the seat cushion, and the seat cushion is formed to have a front rising shape so as to prevent the hip parts from sliding forward. Therefore, when the seat cushion is configured to sink down to the floor so that the front part thereof is dropped about the rear side rotary shaft, as described above, it is possible to effectively sink down the seat cushion also in a narrow sinking space. Also, the power transmission member is configured by the link member of a rigid body, and the seat cushion can be pulled up by the movement of raising the seat back, so that it is possible to configure the tilt down mechanism with a small number of components. The corresponding configuration is not limited to a case where it is applied to the narrow sinking space of the seat cushion, and can also be applied to a wide sinking space. That is, the corresponding configuration can be applied to a variety of configurations, as one of methods of sinking down the seat cushion.

In the above vehicle seat, when the seat back is within a tilting down region in front of a predetermined forward tilting angle at which the seat back is in front of an adjustment region of a backrest angle, the power transmission member may be configured to transmit the forward tilting down movement of the seat back to the front link as a tilting down force, and when the seat back is within a region rear to the tilting down region, the power transmission member may be configured to release power transmission from the seat back to the front link.

Accordingly, when adjusting the backrest angle of the seat back, it is possible to prevent an unexpected situation where the front link is erroneously tilted downward.

In the above vehicle seat, the power transmission member may be configured so that a first link rotatably coupled to the seat back and extending downward and a second link rotatably coupled to the front link and extending rearward are rotatably coupled to each other to transmit the movement of the seat back to the front link.

Accordingly, even when the seat back is tilted down forward or raised from a tilted down position, the power transmission member can move without largely protruding from the seat shape. Therefore, it is possible to implement a compact configuration.

What is claimed is:

1. A vehicle seat comprising:
   a seat back;
   a seat cushion having a front part and a rear part;
   a tilt down mechanism including:
      a first rotary shaft that couples the rear part of the seat cushion to a base on a floor;
      a front link that couples the front part of the seat cushion to the base; and
      a power transmission member that couples the front link and the seat back, the power transmission member including a rigid link member; and
   a second rotary shaft that connects the seat back to the base on the floor, wherein
   the power transmission member tilts the front link downward in conjunction with a forward tilting down movement of the seat back around the second rotary shaft, thereby sinking down the front part of the seat cushion about the first rotary shaft, and
   the power transmission member is configured to transmit a movement of the seat back from a forward titled down position to the front link to raise the front link and pull up the seat cushion from a downward sunk position.

2. The vehicle seat according to claim 1, wherein
   the power transmission member is configured to transmit the forward tilting down movement of the seat back to the front link as a tilting down force based upon the seat back being disposed within a tilting down region in front of a predetermined forward tilting angle at which the seat back is in front of an adjustment region of a backrest angle, and
   the power transmission member is configured to release power transmission from the seat back to the front link based upon the seat back being disposed within a region rear to the tilting down region.

3. The vehicle seat according to claim 2, wherein the power transmission member comprises:
   a first link rotatably coupled to the seat back and extending downward:, and
   a second link rotatably coupled to the front link and extending rearward, wherein
   the first link and the second link are rotatably coupled to each other so as to be configured to transmit the movement of the seat back to the front link.

4. The vehicle seat according to claim 3, wherein
   the first link includes a hole and the base includes a support shaft that is vertically slidable within the hole and thereby rotatably coupled to the first link.

5. The vehicle seat according to claim 1, wherein the power transmission member comprises:
   a first link rotatably coupled to the seat back and extending downward; and
   a second link rotatably coupled to the front link and extending rearward, wherein
   the first link and the second link are rotatably coupled to each other so as to be configured to transmit the movement of the seat back to the front link.

6. The vehicle seat according to claim 5, wherein
   the first link includes a hole and the base includes a support shaft that is vertically slidable within the hole and thereby rotatably coupled to the first link.

7. The vehicle seat according to claim 1, wherein the second rotary shaft extends through the seat back and the base.

\* \* \* \* \*